United States Patent [19]
Young et al.
[11] Patent Number: 4,660,193
[45] Date of Patent: Apr. 21, 1987

[54] DIGITAL MODULATION METHOD FOR STANDARD BROADCAST FM SUBCARRIER

[75] Inventors: Jing J. Young, Indianapolis, Ind.; Richard L. Stuart, Columbia, Md.

[73] Assignee: Regency Electronics, Inc., Indianapolis, Ind.

[21] Appl. No.: 540,518

[22] Filed: Oct. 11, 1983

[51] Int. Cl.[4] .................... H04J 9/00
[52] U.S. Cl. .................... 370/11; 455/45; 381/4
[58] Field of Search .................... 370/11, 122, 110.4, 370/76; 381/4; 375/39; 455/45

[56] References Cited

U.S. PATENT DOCUMENTS

| | | | |
|---|---|---|---|
| 2,578,714 | 12/1951 | Martin | 455/45 |
| 2,709,254 | 5/1955 | Halstead | 370/122 |
| 3,160,812 | 12/1964 | Scantlin . | |
| 3,714,375 | 1/1973 | Stover . | |
| 4,379,947 | 4/1983 | Warner | 370/11 |
| 4,476,573 | 10/1984 | Duckeck | 455/45 |
| 4,517,562 | 5/1985 | Martinez | 370/11 |

OTHER PUBLICATIONS

Request for Proposal for SCA-FM Receivers, Multicomm Project, Mutual Broadcasting System, Broadcast and Communication S., Arlington, VA 4/22/83.

Request for Proposal for Phase II SCA-FM Receivers, Multicomm Project Mutual Broadcasting System, Broadcast & Comm. Serv., Arlington, VA 12/28/82.

Feher, Digital Communications: Microwave Applications, Prenctice-Hall, Inc., Englewood Cliffs, NJ., 1981, pp. 122-124.

*Primary Examiner*—Douglas W. Olms
*Assistant Examiner*—M. Huseman
*Attorney, Agent, or Firm*—Woodard, Weikart, Emhardt & Naughton

[57] ABSTRACT

A digital transmission system using standard FM broadcast stations employs an SCA subcarrier which is amplitude modulated with a second subcarrier modulated to have different phase orientations representative of digital data. Bits are separated from a digital data stream in groups and are differentially encoded into one of at least four phase orientations of the second subcarrier. The amplitude modulated SCA subcarrier is combined with the stereo signal output of a stereo multiplexer to form the modulating signal for the station FM modulator. The receiver includes a differential phase detector for reconstruction of the differentially encoded digital data.

A system which additionally includes means for modulating the SCA subcarrier with a composite signal having an audio signal in addition to the differentially encoded second subcarrier is disclosed.

16 Claims, 6 Drawing Figures

| BIT PAIR | PHASE CHANGE |
|---|---|
| 01 | 0° |
| 00 | 90° |
| 10 | 180° |
| 11 | -90° |

DIGITAL MODULATION METHOD FOR STANDARD BROADCAST FM SUBCARRIER

FIELD OF THE INVENTION

The invention relates to a method for modulating a subcarrier with digital signals in connection with a standard FM broadcast station.

BACKGROUND OF THE INVENTION

In the past, some standard broadcast FM stations (operating from 88.1 to 107.9 MHz) have incorporated a subcarrier at, for example, 67 kHz which was frequency modulated to incorporate audio information, such as background music (Muzak). This subcarrier has sometimes been referred to as the SCA subcarrier (subsidiary communications authorization). Additionally, digital systems utilizing the SCA subcarrier were developed which transmitted data by frequency shift keyed modulation of the subcarrier. Since the frequency swing of the composite signal had to be restricted to avoid adjacent channel interference, the amplitude of the subcarrier has been required to be restricted to a level which would produce not more than 7.5 kHz deviation.

Several systems have been proposed to use the SCA subcarrier for both digital and audio use. One such system, proposed by Mutual Broadcasting, frequency modulated the SCA subcarrier with a composite signal. This composite signal included an audio signal plus a signal obtained from digital information modulating a second 4QAM (four-level quadrature amplitude modulation) modulated subcarrier. While this sytem was an improvement over earlier systems, it was unable to accommodate the digital baud rate desired.

SUMMARY OF THE INVENTION

Standard broadcast (88.1 to 107.9 MHz) FM transmitters conventionally carry an audio signal (either monaural or, if stereo, the sum of right and left audio channels for stereo) and, if stereo, a multiplexed signal representing the difference between the right and left channel. The invention relates to a system having a standard broadcast FM tranmitter and receiver which additionally utilizes an SCA subcarrier (above 60 kHz) by amplitude modulating and demodulating the subcarrier (such as with full amplitude modulation or with single-sideband or double-sideband suppressed-carrier) with a signal which includes a second subcarrier which has been modulated to have different phase orientations for digital data.

Preferably the second subcarrier incorporates 4-phase quadrature phase-shift-keyed modulation or the equivalent 4-level quadrature double-sideband suppressed-carrier amplitude modulation. Alternatively, higher order modulation techniques may also be used, such as 8-phase PSK or 16-ary QAM. Also, preferably, an audio signal additionally amplitude modulates the SCA subcarrier directly.

DESCRIPTION OF THE PREFERRED EMBODIMENT

Figure 1:
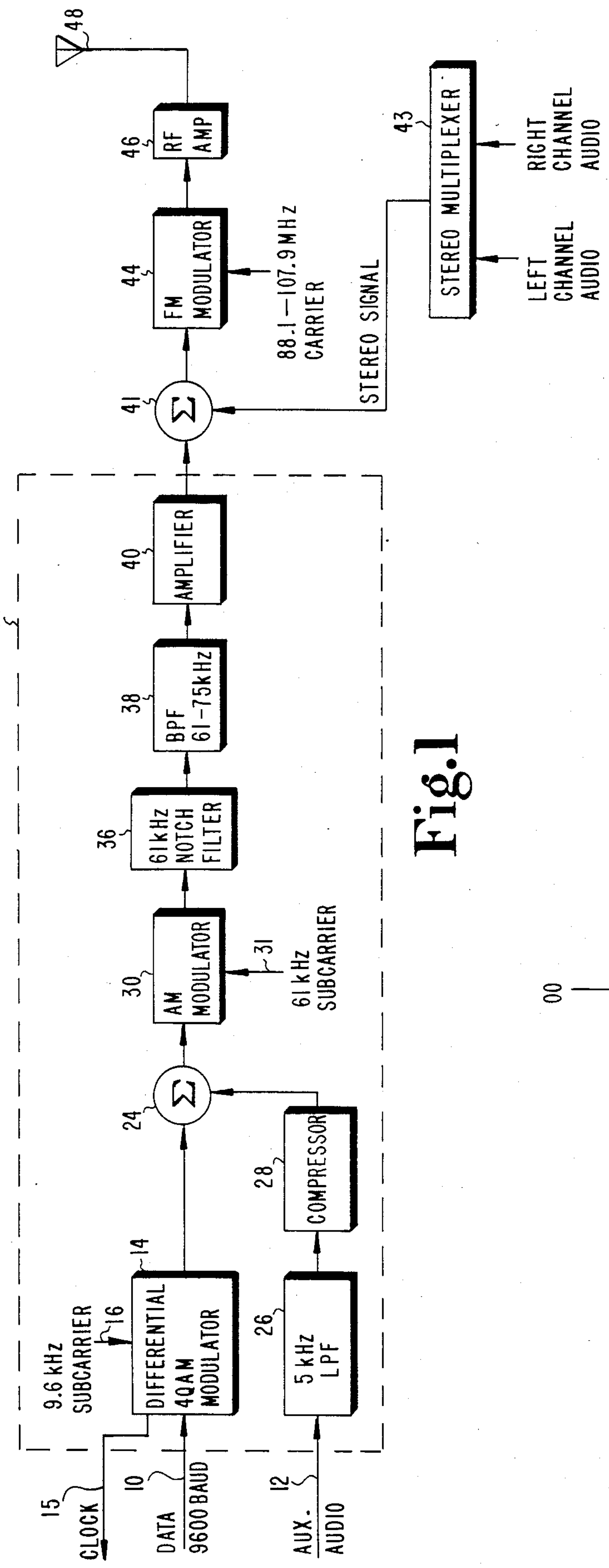
FIG. 1 is a block diagram of a digital transmission system using standard FM broadcast stations according to the preferred embodiment of the present invention.

Referring to FIG. 1, a digital transmission system using standard FM broadcast stations is shown in block diagram form. Digital data at 9600 baud is received on input line 10, and an auxiliary audio signal is received on line 12. The digital data on line 10 is clocked into differential 4QAM (4-level quadrature amplitude modulation) modulator 14 under control of a clock signal generated therein and supplied to the data source (not shown) on line 15. 4QAM modulator 14 is a phase oriented modulator which removes data from the digital data stream in pairs of bits and differentially encodes each pair into one of four quadrature-amplitude-modulated signals. Differential encoding of the data conveys the information by carrier phase changes from the previously sent phase, rather than by the absolute phase of the carrier with respect to a reference signal.

Figure 2:
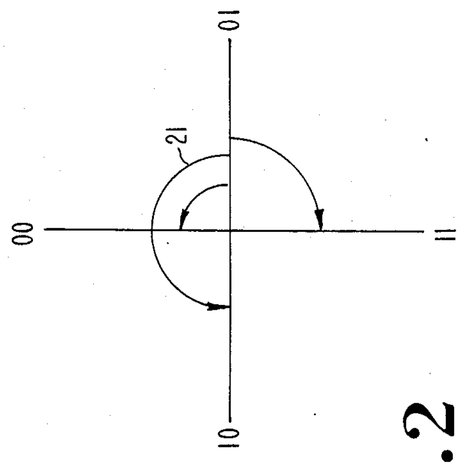
FIG. 2 illustrates the phase coding relationship for the differential encoding and decoding of data as performed by the system according to the preferred embodiment of the present invention.

The phase change of the carrier is determined by pairs of bits which are sequentially taken from the digital data stream. FIG. 2 shows the phase change relationship for differential encoding of received bit pairs, in tabular and graphical form. As an example, if the bit pair 10 is received by differential 4QAM modulator 14, the 4QAM signal generated by modulator 14 shifts in phase by 180 degrees with respect to the phase of the previous 4QAM signal, as indicated at 21 in FIG. 2.

Differential 4QAM modulator 14 operates in conventional fashion and the details of its operation are not shown. In general, however, it phase-divides the 9.6 kHz subcarrier signal received on line 16 into an in-phase (I) subcarrier and a quadrature (Q) subcarrier shifted 90 degrees with respect to the I subcarrier, in conventional quadrature modulation fashion. The I and Q subcarriers are supplied respectively to I and Q AM modulators each of which also receives one bit of a modulating signal bit pair as a modulating signal. The current modulating signal bit pair is different from the previous modulating signal bit pair by an amount dependent on the bit pair received on line 10. The in-phase and quadature modulated signals are added to produce a 4QAM signal.

It will be appreciated that the four possible 4QAM signals are separated in phase from each other by an integral multiple of 90 degrees. Further, it will be understood by those skilled in the art that a 4QAM signal as described hereinabove is identical to that produced in a 4-phase phase-shift-keying (4PSK) modulator. Reference to one form of modulation herein is intended to encompass the other.

4QAM modulator 14 includes a raised cosine bandpass filter, with a passband from 6.0 to 13.2 kHz, to shape the 4QAM signal spectrum prior to transmission. 4QAM modulator 14 also has an internal scrambler of conventional design which introduces changes into the bit stream to guarantee phase changes of sufficient frequency in the transmitted signal to enable the receiver to recover a clock signal from the transmitted signal.

Figure 3:
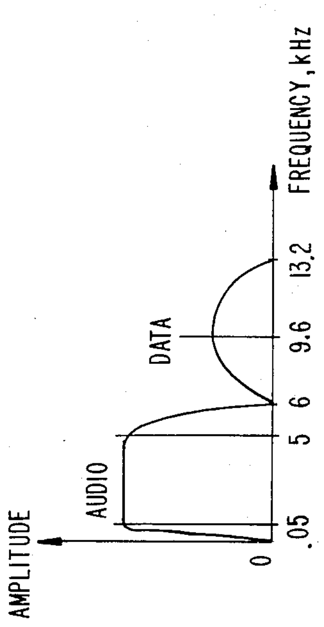
FIG. 3 is a graph of the baseband spectrum of the composite signal comprised of 4QAM data and auxiliary audio found at the input to the AM modulator of FIG. 1.

The 4QAM output signal of modulator 14 is coupled to summing amplifier 24. The audio signal input on line 12 is limited to frequencies below 5 kHz by low pass filter 26, and the high-amplitude excursions of the filtered signal are compressed in compressor 28. The compressed audio signal and the 4QAM signal are combined in summing amplifier 24 to form a composite signal having audio and digital components in adjacent portions of the baseband spectrum, as illustrated in FIG. 3.

Figure 4:
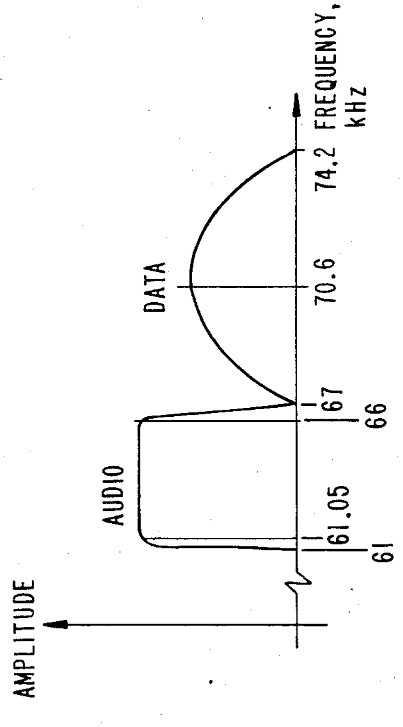
FIG. 4 is a graph of the spectrum of the single-sideband, suppressed-carrier modulated signal at the output of amplifier 40 of FIG. 1.

The composite signal is supplied to AM modulator 30 which effects the modulation of the 61 kHz subcarrier signal received on line 31. AM modulator 30 partially suppresses the carrier, 61 kHz notch filter 36 provides further carrier suppression, and bandpass filter 38 eliminates the lower sideband, resulting in a single-sideband, suppressed-carrier signal having a spectrum bandwidth from 61 kHz to 74.2 kHz, as shown in FIG. 4. After further amplification in amplifier 40, the composite AM signal is supplied to summing amplifier 41, where it is added to a stereo signal generated by stereo multiplexer 43. Stereo multiplexer 43 operates in a conventional manner, generating the sum of left and right channel audio signals as well as the difference between those same signals, and multiplexing the sum and difference signals into one stereo signal. The output signal from summing amplifier 41 is the FM modulating signal which is fed to FM modulator 44. FM modulator 44 generates a frequency-modulated signal on a selected carrier frequency in the standard broadcast FM band of 88.1 MHz to 107.9 MHz. The resulting FM signal is amplified in RF amplifier 46 and transmitted from antenna 48.

Figure 5:
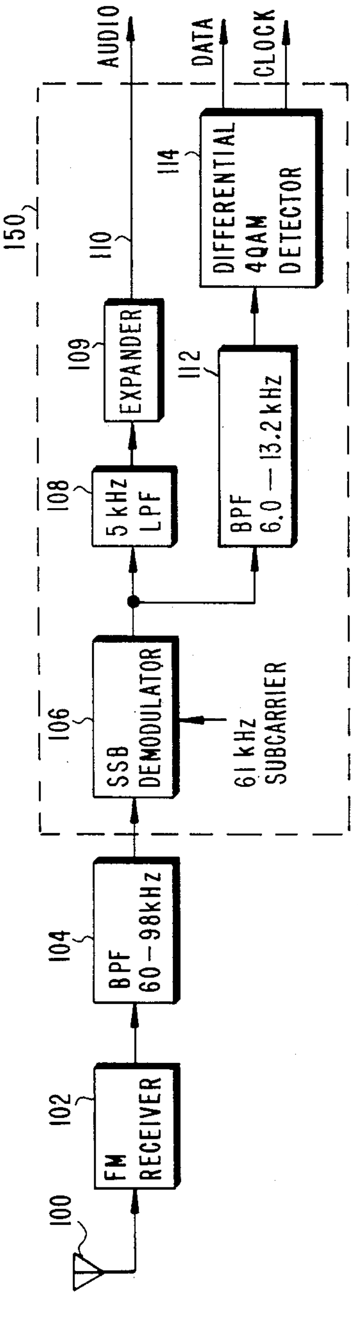
FIG. 5 is a block diagram of a receiver according to the present invention.

The voice and digital information carried on the SCA subcarrier may be detected using a receiver such as that shown in FIG. 5. Referring now to FIG. 5, an incoming RF signal is received on antenna 100 and supplied to receiver 102 which is tuned to the appropriate main FM channel frequency. Receiver 102 demodulates the received FM signal and produces modulated SCA subcarrier as well as any multiplexed stereo or other audio signal which may be present on the main channel frequency. Bandpass filter 104, with corner frequenices of 60 kHz and 98 kHz, provides attenuation of stereo signals, including the 19 kHz and 38 kHz reference signals, which may be 20 db higher than the SCA signal. The output spectrum of bandpass filter 104 is substantially the same as that shown in FIG. 4.

The 61 kHz subcarrier is reinserted at SSB demodulator 106 which detects the audio and digital modulation on the 61 kHz subcarrier. The output spectrum of SSB demodulator 106 includes the original baseband spectrum shown in FIG. 3 as well as a subcarrier frequency component at 61 kHz and a higher-frequency band at 122 kHz.

The recovered composite signal is applied in parallel to audio and digital signal recovery circuits. Low pass filter 108, with a corner frequency of 5 kHz, filters out the digital data portion of the spectrum, and expander 109 provides nonlinear gain inversely corresponding to that of compressor 28 (FIG. 1), thereby restoring the original relative amplitudes in the auxiliary audio signal. Expander 109 supplies the recovered auxiliary audio signal on line 110 for audio amplification and connection to speakers (not shown). Similarly, bandpass filter 112, with a passband from 6.0 to 13.2 kHz, rejects the audio signal portion of the spectrum and passes the 4QAM signal to differential 4QAM detector 114. Differential 4QAM detector 114 operates in conventional fashion and the details of its operation are not shown. In general, however, it decodes phase changes in the received waveform into one of four levels according to the relationship shown in FIG. 2. 4QAM detector 114 incorporates a descrambler in conventional form corresponding with the scrambler in 4QAM modulator 14. Continuing with the same example as before, when 4QAM detector 114 detects the phase change of 180 degrees in one interval with respect to the previous interval, it decodes the change into the original bit pair 10. 4QAM detector 114 outputs the decoded bit pair on the data line.

Differential phase detection is preferred over fixed-reference phase detection because the latter is susceptible to phase jitter and other channel disturbances (such as those resulting from multipath radio interference). These disturbances create the problem of both establishing the fixed reference and maintaining it in its fixed phase. Once the receiver loses synchronization, the time required to reestablish synchronization is often much longer than the duration of the disturbance. In contrast, with differential phase detection, an error burst affects only data decoded during the error burst and one interval following the burst. That is, if a channel disturbance results in a phase shift during one interval, the detected phase changes between that interval and the previous interval and between that interval and the following interval will both be incorrect. However, the second decoded bit pair following the error burst will be correct, because by that time two 4QAM signals will have been correctly received.

A Gray code, as shown in FIG. 2, is preferred for differential encoding to minimize bit errors due to phase shifts caused by channel disturbances. Phase errors of 90 degrees are more likely than errors of 180 degrees, thus with the Gray code errors are more likely to effect only one bit per bit pair. When used with an appropriate error-correcting code, such as the Golay (23, 12) code, in which errors of up to three bits in two consecutive bit pairs of a 23-bit word can be corrected, the Gray code reduces the overall probability of error.

4QAM detector 114 also includes circuitry for recovering the original clock frequency for use in later synchronizing other circuitry (not shown) to the digital data. 4QAM detector 114 recovers this frequency from the transmitted waveform irrespective of the phase shift, if any, and supplies the resulting clock signal on the clock line. Scrambling and descrambling of the bit stream guarantees that the 4QAM signal carries sufficient phase changes to enable clock recovery by detector 114.

Figure 6:
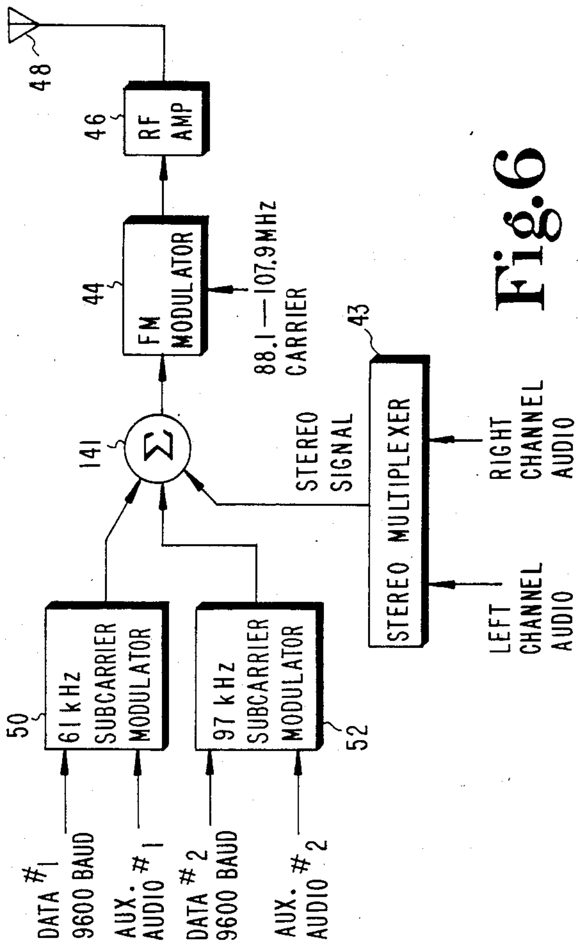
FIG. 6 is a block diagram of an alternative embodiment of the present invention in which two SCA subcarriers are employed.

One alternative embodiment, shown in block diagram form in FIG. 6, employs two subcarries, one at 61 kHz and the other at 97 kHz. 61 kHz subcarrier modulator 50, also shown inside dotted lines in FIG. 1, has already been described. 97 kHz subcarrier modulator 52 contains the same functional blocks as modulator 50 but operates with a 97 kHz subcarrier and is designed to generate the lower sideband instead of the upper sideband as in modulator 50, the notch and bandpass filters being designed accordingly. The outputs of modulators 50 and 52 are combined in summing amplifier 141 along with a stereo signal generated, as already described, by stereo multiplexer 43. The output signal from summing amplifier 141 is the FM modulating signal for FM modulator 44, which generates an FM signal as described with reference to FIG. 1. The FM signal is amplified in RF amplifier 46 and transmitted from antenna 48. The receiver for this embodiment is similar to the receiver already described with reference to FIG. 5, the difference being the addition of a second subcarrier detector similar to subcarrier detector 150, shown inside dotted lines in FIG. 5.

Alternatively, higher order modulation techniques, such as 8-phase PSK or 16-ary QAM, may be used in place of 4QAM in the phase oriented modulator, modulator 14, and in the phase oriented detector, detector 114, without departing from the scope of the invention. In the case of 16-ary QAM, the modulated signal has one of three different amplitudes in addition to having one of at least four phase angles. Accordingly, modulator 14 is adapted to provide variable amplitude as well as phase, and detector 114 is correspondingly adapted to detect changes in amplitude as well as phase. The phase and amplitude relationship for 16-ary QAM is further described in Feher, Digital Communications: Microwave Applications, Prentice-Hall, Inc., Englewood Cliffs, N.J. 07632, 1981, pp. 122–3.

It will thus be understood that an improved system for modulating an SCA subcarrier with both digital and audio information has been described. This system provides improved signal-to-noise ratio while transmitting digital data received from a data source at a desired baud rate of 9600 baud.

While the invention has been illustrated and described in connection with the preferred embodiment, the same is to be considered as illustrative and not restrictive in character, it being understood that all changes and modifications that come within the spirit of the invention are desired to be protected.

What is claimed is:

1. A receiver which comprises:
(a) an FM detecting means, tuned to a radio frequency signal of a standard FM broadcast station, for detecting frequency modulation of a received carrier in said radio frequency signal;
(b) an amplitude sensitive detecting means connected to the output of said FM detecting means, and tuned to a subcarrier frequency band above 60 kHz, for detecting amplitude modulation of a subcarrier, said amplitude sensitive detecting means including means for reconstructing from said detected amplitude modulation a composite signal having audio and digital components in adjacent portions of its baseband spectrum;
(c) a phase oriented detecting means connected to the output of said amplitude sensitive detecting means for detecting modulation at any one of at least four discrete phase angles and at least one amplitude and for producing digital bit groups therefrom;
(d) means for producing digital data from the digital bit groups from said phase oriented detector;
(e) a low pass filter connected to the output of said amplitude sensitive detecting means; and
(f) means for producing an audio output signal from the output of said low pass filter.

2. The receiver of claim 1 in which said amplitude sensitive detecting means is a single-sideband detector.

3. The system of claim 1 in which said phase oriented detecting means differentially decodes said modulation detected at any one of at least four discrete phase angles and at least one amplitude and produces digital bit groups from said differentially decoded modulation.

4. The receiver of claim 1 in which said phase oriented detecting means is a quadrature detector for detecting an in-phase and a quadrature signal.

5. The receiver of claim 4 in which said phase oriented detecting means is a 4QAM detector.

6. The receiver of claim 5 in which said phase oriented detecting means differentially decodes said modulation detected at any one of at least four discrete phase angles and at least one amplitude and produces digital bit groups from said differentially decoded modulation.

7. The receiver of claim 6 in which said amplitude sensitive detecting means is a single-sideband detector.

8. The receiver of claim 7 in which said single-sideband detector reinserts an about 61 kHz carrier and detects the upper sideband and in which said 4QAM detector tunes to about 9.6 kHz.

9. A digital transmission system using standard FM broadcast stations which comprises:
(a) a source of digital data;
(b) means for sequentially producing bit groups of digital signals from said source;
(c) a phase oriented modulating means for modulating a first subcarrier with said bit groups to produce a modulated signal at any one of at least four discrete phase angles and at least one amplitude, said phase oriented modulating means being connected to the output of said means for producing;
(d) means for combining said modulated signal with an audio signal to form a composite signal having audio and digital components in adjacent portions of its baseband spectrum;
(e) an amplitude modulating means connected to the output of said phase oriented modulating means and responsive to said composite signal from said combining means for amplitude modulating a second subcarrier at a frequency above 60 kHz; and
(f) an FM modulating means for frequency modulating a radio frequency signal of a standard FM broadcast station in response to the output of said amplitude modulating means.

10. The system of claim 9 in which said amplitude modulating means is a single-sideband modulator.

11. The system of claim 9 in which said phase oriented modulating means is a differential modulator for differential encoding of said first subcarrier.

12. The system of claim 9 in which said phase oriented modulating means is a quadrature modulator for modulating an in-phase and a quadrature signal.

13. The system of claim 12 in which said phase oriented modulating means is a 4QAM modulator.

14. The system of claim 13 in which said phase oriented modulating means is a differential modulator for differential encoding of said first subcarrier.

15. The system of claim 14 in which said amplitude modulating means is a single-sideband modulator.

16. The system of claim 15 in which said second subcarrier is about 61 kHz and said single-sideband modulator produces the upper sideband and in which said first subcarrier is about 9.6 kHz.

* * * * *